UNITED STATES PATENT OFFICE.

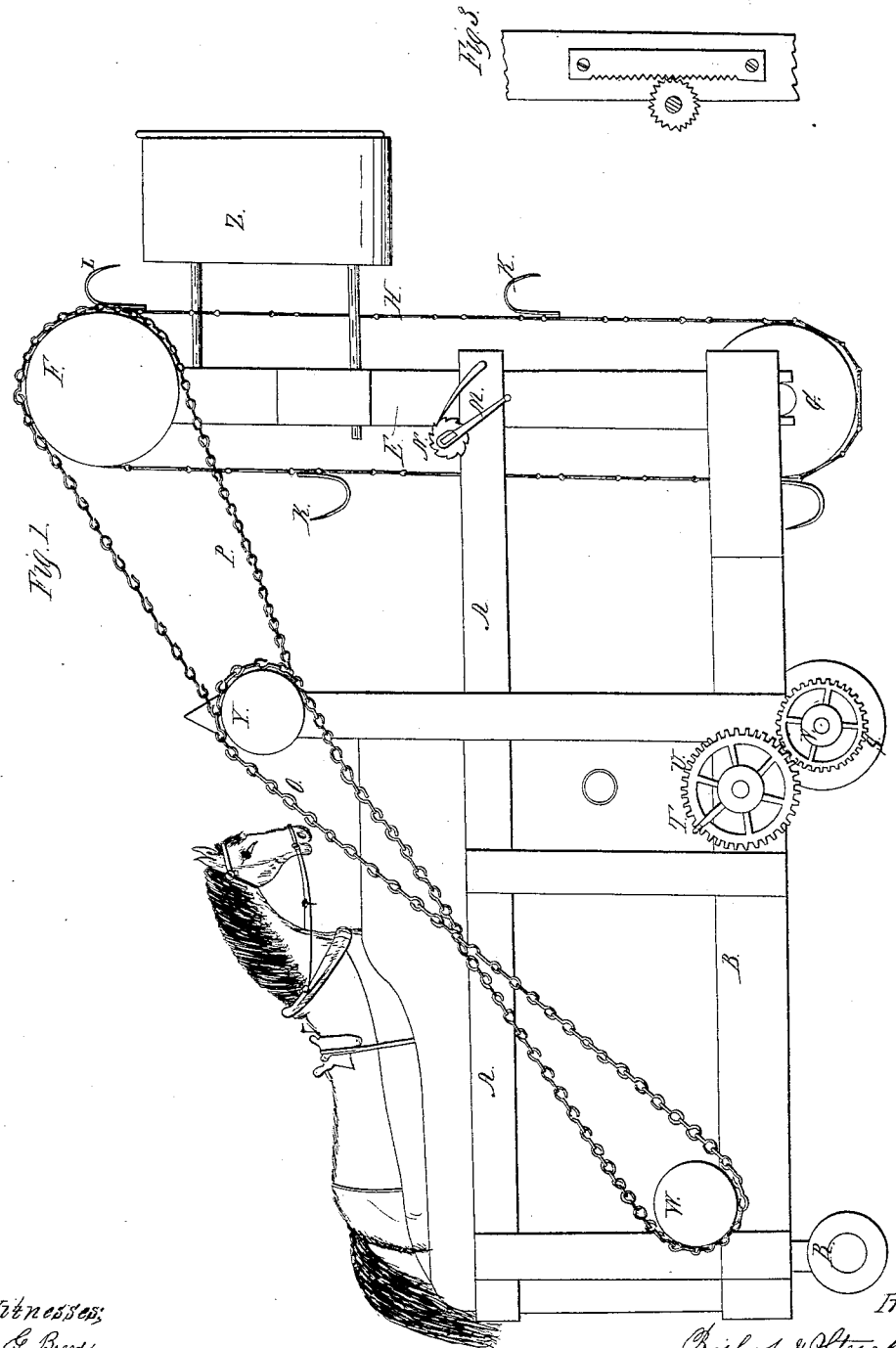
Bishop & Steveley,
Horse Power.
N° 45,968. Patented Jan. 24, 1865.
Witnesses:
G. Breed
Eliza Heath
Inventor:
Bishop & Steveley
per Daniel Breed Atty

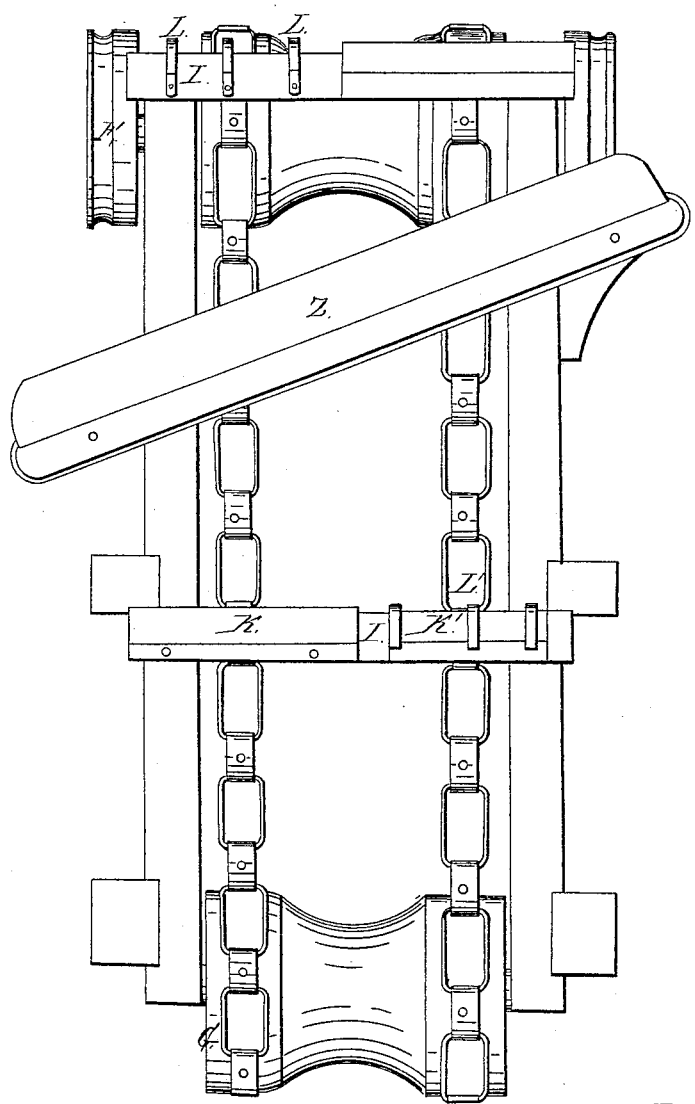

STEPHEN T. BISHOP AND ANDREW STEVELEY, OF FOND DU LAC, WIS.

IMPROVEMENT IN HORSE-POWER ELEVATORS AND EXCAVATORS.

Specification forming part of Letters Patent No. 45,968, dated January 24, 1865.

*To all whom it may concern:*

Be it known that we, STEPHEN T. BISHOP and ANDREW STEVELEY, of Fond du Lac, in the county of Fond du Lac and State of Wisconsin, have invented a new and useful Improvement in Horse-Power Excavators and Elevators; and we do hereby declare that the following is a full and exact description thereof, reference being had to the accompanying drawings, and to the letters of reference marked thereon.

Our invention consists in certain peculiar arrangements for elevating and depressing an endless chain and pulley for excavating earth in grading railroads, and for other purposes.

Having made application for separate patents for other features of the machine represented in the accompanying drawings, we confine the present application to the means for adjusting the endless chain.

In the drawings, Figure 1 is a side view of our combined horse-power and excavator. Fig. 2 is a detached view of the notched bar and ratchet-wheel employed in elevating and lowering the endless chain.

Our improved excavator is combined with a tread horse-power, both upon the same frame, as seen in Fig. 1. The horse working upon the apron sets the pulley W in motion. By means of the chains O and P, motion is transmitted to the pulley F, thus setting the chain H and pulley G in motion. Upon this endless chain H are arranged a series of hooks or diggers and buckets for elevating the earth. The hooks L and the buckets K are placed alternately upon the chain H, so that the hooks dig up the earth while the buckets carry it away and deposit the same upon the discharge-apron Z.

As the machine is represented in the drawings it will be seen that the hooks and buckets work below the level or tread of the wheels R and S, upon which the machine is supported. The first stroke of the hooks and buckets will take the earth within the sweep of the buckets, so that it is necessary to lower the endless chain H and the buckets in order to strike lower when the next bucket passes under the roller G. This adjustment of the chain H and rollers F and G is shown in red lines in Fig. 1.

In order to place the adjustment of the buckets and endless chain completely under the control of the operator, we have arranged the frame E so it may slide up and down in the main frame of the machine. The upright pieces of the frame E slide in bearings or notches in the horizontal pieces A and B of the frame. Upon the same shaft with the ratchet-wheel N are placed two other ratchet-wheels which work into notches or notched bars upon the upright pieces of the frame E. One of these ratchet-wheels and notched bars is seen in Fig. 3, detached from the machine. A crank, M, enables the operator to raise or lower the frame at pleasure.

The machine is mounted upon wheels R and S, like a wagon, so as to advance as the work of excavation proceeds, or be withdrawn at pleasure.

Having thus fully described our invention, what we claim, and desire to secure by Letters Patent of the United States, is—

1. The adjustable frame C, in combination with the horse-power, substantially as set forth.

2. The arrangement of the ratchet-wheels, as shown in Figs. 1 and 3, in combination with the crank N and frame E, substantially in the manner and for the purposes set forth.

3. The combination of the ratchet-wheels and crank N, with the notched bar, Fig. 3, substantially in the manner and for the purposes described.

STEPHEN T. BISHOP.
ANDREW STEVELEY.

Witnesses to the signature of Stephen T. Bishop:
    DANIEL BREED,
    G. BREED.

Witnesses to the signature of Andrew Steveley:
    W. B. KELLOGG,
    S. M. IVES.